US009098844B2

(12) United States Patent
Davis et al.

(10) Patent No.: US 9,098,844 B2
(45) Date of Patent: Aug. 4, 2015

(54) MOBILE ELECTRONIC WALLET

(75) Inventors: Martin Davis, Charlotte, NC (US);
Michael Thomas Duke, Monroe, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 27 days.

(21) Appl. No.: 11/943,365

(22) Filed: Nov. 20, 2007

(65) Prior Publication Data
US 2009/0132392 A1    May 21, 2009

(51) Int. Cl.
| | | |
|---|---|---|
| *G07B 17/00* | (2006.01) | |
| *G07F 19/00* | (2006.01) | |
| *G06Q 40/00* | (2012.01) | |
| *G06Q 20/32* | (2012.01) | |
| *G06Q 10/08* | (2012.01) | |
| *G06Q 20/36* | (2012.01) | |
| *G06Q 20/38* | (2012.01) | |
| *G06Q 20/40* | (2012.01) | |
| *G06Q 40/02* | (2012.01) | |

(52) U.S. Cl.
CPC .............. *G06Q 20/32* (2013.01); *G06Q 10/087* (2013.01); *G06Q 20/327* (2013.01); *G06Q 20/363* (2013.01); *G06Q 20/385* (2013.01); *G06Q 20/3821* (2013.01); *G06Q 20/40145* (2013.01); *G06Q 40/00* (2013.01); *G06Q 40/02* (2013.01)

(58) Field of Classification Search
CPC ....... G06Q 40/10; G06Q 40/02; G06Q 40/00; G06Q 30/04; G06Q 20/10; G06Q 20/105; G06Q 7/1008; G06Q 20/341; G06Q 20/40; G06Q 20/04
USPC ................................................ 705/30, 41, 44
See application file for complete search history.

(56) References Cited

U.S. PATENT DOCUMENTS

| | | | |
|---|---|---|---|
| 5,991,749 A | 11/1999 | Morrill, Jr. | |
| 6,021,212 A * | 2/2000 | Ho ................................ | 382/124 |
| 6,526,390 B1 * | 2/2003 | Wang et al. ..................... | 705/39 |

(Continued)

FOREIGN PATENT DOCUMENTS

| | | |
|---|---|---|
| WO | 03046777 A2 | 6/2003 |
| WO | 03049364 A1 | 6/2003 |

OTHER PUBLICATIONS

A two-factor Mobile authentication service by Robert Di Pietro: Proceedings of international conf on MObile Business (ICMB05) 0-7695-2367-6/05: 2005.*

(Continued)

*Primary Examiner* — Matthew Gart
*Assistant Examiner* — Harshad Parikh
(74) *Attorney, Agent, or Firm* — Kegler Brown Hill & Ritter; James J. Pingor

(57) ABSTRACT

Association of personal, financial, and/or business-related identification information with a mobile communication device (MCD) is provided for herein. For example, an MCD can be associated with a financial account and can further include an identification component that verifies an identity of a user of the MCD. Identity can be verified by biometric analysis (e.g., finger/thumb print scan), username and password, optical feature scan, or a combination thereof or of like mechanisms, for instance. Accordingly, the claimed subject matter provides a mechanism to verify identification of a user of an MCD and incorporate user ID into remote data exchange, including remote financial transactions, with one or more networked devices.

25 Claims, 11 Drawing Sheets

(56) References Cited

U.S. PATENT DOCUMENTS

| | | | |
|---|---|---|---|
| 6,913,191 B2* | 7/2005 | Goldberg et al. | 235/375 |
| 7,089,208 B1* | 8/2006 | Levchin et al. | 705/39 |
| 7,130,615 B2* | 10/2006 | Montz et al. | 455/411 |
| 7,184,747 B2* | 2/2007 | Bogat | 455/406 |
| 7,280,847 B2* | 10/2007 | Goldthwaite et al. | 455/558 |
| 7,689,508 B2* | 3/2010 | Davis et al. | 705/39 |
| 7,830,399 B2* | 11/2010 | Benson et al. | 345/619 |
| 8,224,375 B2* | 7/2012 | Roberts | 455/550.1 |
| 8,443,096 B2* | 5/2013 | Bolton et al. | 709/230 |
| 8,452,903 B2* | 5/2013 | Bolton et al. | 710/62 |
| 8,566,186 B1* | 10/2013 | Heit et al. | 705/30 |
| 8,750,901 B1* | 6/2014 | Gupta et al. | 455/456.3 |
| 2002/0181710 A1* | 12/2002 | Adam et al. | 380/270 |
| 2003/0204446 A1* | 10/2003 | Borovoy | 705/26 |
| 2004/0006699 A1* | 1/2004 | von Mueller et al. | 713/185 |
| 2004/0010472 A1* | 1/2004 | Hilby et al. | 705/67 |
| 2004/0169073 A1* | 9/2004 | Goldberg et al. | 235/375 |
| 2004/0176134 A1* | 9/2004 | Goldthwaite et al. | 455/558 |
| 2004/0177005 A1* | 9/2004 | Poltorak | 705/21 |
| 2004/0230489 A1* | 11/2004 | Goldthwaite et al. | 705/26 |
| 2005/0054328 A1* | 3/2005 | Montz et al. | 455/411 |
| 2005/0071879 A1* | 3/2005 | Haldavnekar et al. | 725/81 |
| 2005/0154674 A1 | 7/2005 | Nicholls et al. | |
| 2005/0167512 A1* | 8/2005 | Minemura et al. | 235/492 |
| 2005/0187873 A1* | 8/2005 | Labrou et al. | 705/40 |
| 2006/0036456 A1* | 2/2006 | Wu | 705/1 |
| 2006/0161435 A1* | 7/2006 | Atef et al. | 704/246 |
| 2006/0165060 A1* | 7/2006 | Dua | 370/352 |
| 2006/0180660 A1* | 8/2006 | Gray | 235/380 |
| 2006/0235785 A1 | 10/2006 | Chait et al. | |
| 2007/0050262 A1* | 3/2007 | Van Breemen et al. | 705/26 |
| 2007/0203853 A1 | 8/2007 | Gindi | |
| 2007/0250393 A1* | 10/2007 | Alberth et al. | 705/26 |
| 2007/0254712 A1* | 11/2007 | Chitti | 455/558 |
| 2007/0255652 A1 | 11/2007 | Tumminaro et al. | |
| 2007/0255653 A1* | 11/2007 | Tumminaro et al. | 705/39 |
| 2007/0262136 A1* | 11/2007 | Ou | 235/380 |
| 2007/0265984 A1* | 11/2007 | Santhana | 705/65 |
| 2008/0023543 A1* | 1/2008 | Beisang | 235/382 |
| 2008/0086458 A1* | 4/2008 | Robinson et al. | 707/3 |
| 2008/0103972 A1* | 5/2008 | Lanc | 705/44 |
| 2008/0146194 A1* | 6/2008 | Yang et al. | 455/411 |
| 2008/0222038 A1* | 9/2008 | Eden et al. | 705/44 |
| 2009/0037285 A1* | 2/2009 | Murphy | 705/16 |
| 2009/0080708 A1* | 3/2009 | Mellen et al. | 382/115 |
| 2009/0132392 A1* | 5/2009 | Davis et al. | 705/28 |
| 2009/0240593 A1* | 9/2009 | Kelly et al. | 705/26 |
| 2009/0248582 A1* | 10/2009 | Barthelemy | 705/71 |
| 2009/0327131 A1* | 12/2009 | Beenau et al. | 705/44 |
| 2010/0145835 A1* | 6/2010 | Davis et al. | 705/30 |
| 2010/0235550 A1* | 9/2010 | Bolton et al. | 710/62 |
| 2010/0262544 A1* | 10/2010 | Levchin et al. | 705/44 |
| 2010/0274691 A1* | 10/2010 | Hammad et al. | 705/30 |
| 2011/0270758 A1* | 11/2011 | Mizani Oskui | 705/44 |
| 2012/0101951 A1* | 4/2012 | Li et al. | 705/71 |
| 2012/0239529 A1* | 9/2012 | Low et al. | 705/26.41 |
| 2012/0245985 A1* | 9/2012 | Cho et al. | 705/14.23 |
| 2012/0310836 A1* | 12/2012 | Eden et al. | 705/44 |
| 2013/0085887 A1* | 4/2013 | Zhang | 705/26.8 |
| 2013/0185208 A1* | 7/2013 | Aaron et al. | 705/44 |
| 2013/0198081 A1* | 8/2013 | Royyuru et al. | 705/44 |
| 2013/0204785 A1* | 8/2013 | Monk et al. | 705/44 |
| 2013/0212016 A1* | 8/2013 | Davis et al. | 705/42 |
| 2013/0246171 A1* | 9/2013 | Carapelli | 705/14.51 |
| 2013/0311294 A1* | 11/2013 | Ward et al. | 705/14.64 |
| 2014/0012723 A1* | 1/2014 | Lobmaier | 705/35 |
| 2014/0117075 A1* | 5/2014 | Weinblatt | 235/375 |
| 2014/0195426 A1* | 7/2014 | Caldwell | 705/42 |
| 2014/0250003 A1* | 9/2014 | Levchin et al. | 705/41 |
| 2014/0372298 A1* | 12/2014 | Singh et al. | 705/41 |
| 2015/0006377 A1* | 1/2015 | Kang | 705/41 |

OTHER PUBLICATIONS

Go mobile with your money. That's the simple yet powerful idea behind Obopay. https://ww.obopay.com/corporate/aboutUs.shtml. Last accessed Feb. 20, 2008.

Obopay Mobile Payment Service. An Innovative Electronic Payment System for Mobile Users. Published: Nov. 2005.

Obopay Secures $29 Million in Third Round of Funding. Obopay, Inc. Last accessed Feb. 20, 2008.

Mobile Banking. <http://en.wikipedia.org/wiki/Mobile_banking> Last accessed Dec. 12, 2007.

Roberto Di Pietro, et al. A Two-Factor Mobile Authentication Scheme for Secure Financial Transactions. <http://ieeexplore.ieee.org/Xplore/login.jsp?url=/iel5/9999/32116/01493584.pdf &arnumber=1493584> Last accessed Dec. 12, 2007.

Mobile solution to enhance security in online financial transactions. Nov. 11, 2005. <http://www.gadgetguy.de/2005/11/11/mobile-solution-to-enhance-security-in-online-financial-transactions/>.

Sybase iAnywhere. Software Development Kit for Implementing Infrared for Financial Messaging (IrFM). <http://www.ianywhere.com/datasheets/irfm_sdk.html> Last accessed Dec. 12, 2007.

State of Telecom Industry in Pakistan. <http://telecompk.net/2007/04/18/financial-transaction-on-your-phone/> Last accessed Dec. 12, 2007.

MeT Specification. Mobile electronic Transactions. <http://www.cellular.co.za/technologies/met/met_spec.htm> Last accessed Dec. 12, 2007.

MeT. Mobile electronic Transactions. <http://www.cellular.co.za/technologies/met/met.htm> Last accessed Dec. 12, 2007.

* cited by examiner

MOBILE ELECTRONIC WALLET

CROSS REFERENCE TO RELATED APPLICATIONS

The subject application for patent is related to co-pending U.S. Non-Provisional patent application Ser. No. 11/854,018 entitled PEER TO PEER FUND TRANSFER, and filed on Sep. 12, 2007, and to co-pending U.S. Non-Provisional patent application Ser. No. 11/943,362 entitled MOBILE DEVICE CREDIT ACCOUNT, and filed on Nov. 20, 2007, the entireties of which are incorporated herein by reference.

BACKGROUND

Recent advancements in mobile communication technology have enabled not only real-time, remote communication, but also an ability to accomplish such communication without utilizing a stationary telephonic device. Specifically, cellular technology, Bluetooth technology, and the like, have enabled individuals to travel and conduct remote, real-time communicate simultaneously. In addition to voice communication, remote digital information exchange in general has also been accomplished by way of such devices. As a result, the recent generation has aptly been characterized as an age of "information on the move."

As mobile communication devices, e.g., cell phones, smartphones, multi-mode phones, personal digital assistants (PDAs), etc., become more portable and more personal, such devices have become central to the new mobile communication age. For instance, mobile devices can be utilized to browse the Internet, shop online, and download songs, video, and the like. In addition, consumers can access electronic mail, instant messaging (IM), personal planning applications, such as calendars and task lists, entertainment applications, and so on; essentially, the mobile communication device has come to replace stationary personal computers in many aspects. As mobile device popularity increases, service providers also adapt to make their products and services accessible by way of such devices. However, the rate at which mobile computing and communication technology progresses is typically faster than the rate at which service providers can incorporate new applications for mobile technology; consequently, data services may not be fully leveraged at a given point in time for such devices.

More often, personal electronic devices contain or record personal and business related identification information. For instance, security key cards can be used to provide a form of individual identity at a security station (e.g., at an entrance to an office building), providing admittance through the security station upon scanning a valid key card. Credit cards and bank cards contain magnetic strips identifying a financial account associated with the card. Typically, a holder of the card must also present a username, password, and/or personal identification number (PIN) in order to verify user identity in conjunction with an account identity established by the card. As applications leveraging mobile technology become more diverse, however, such forms of identification can also become more integrated.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Association of personal, financial, and/or business-related identification information with a mobile communication device (MCD) is provided for herein. For example, an MCD can be associated with a financial account and can further include an identification component that verifies an identity of a user of the MCD. Identity can be verified by biometric analysis (e.g., finger/thumb print scan), username and password, optical feature scan, or a combination thereof or of like mechanisms, for instance. Access and control of the financial account can be conditioned on verifying identity of a concurrent user with predetermined identity information. Accordingly, the subject innovation can replace conventional personal identification mechanisms for access to a financial account (e.g., driver's license and/or account key) with an MCD.

According to further aspects of the subject innovation, an MCD can store an electronic version of information typically carried in a wallet, purse, handbag, and so forth, and can further verify identity of a person associated with the information. For example, a driver's license or state ID number can be stored on the MCD, also, access information for a checking, savings, credit, money market account, or the like, can be stored on the device. The MCD can store membership information related to business and/or personal organizations, student ID information, insurance information (e.g., auto insurance, medical insurance), medical history information, state and/or federal identification (e.g., social security number), and so on. The MCD can also interface with an electronic server by way of a remote communication interface to provide the server with an identity of a current user of the MCD, as well as the account/membership/personal/business information. In such a manner, the MCD can identify a user and a checking account to an electronic management device at a bank or an ATM, for instance, or the MCD can provide a student ID, state ID, etc., at an appropriate electronic server. Consequently, the subject innovation can replace a traditional wallet or purse in regards to providing personal ID and identifying personal and/or business-related accounts, histories, and associations of one or more users.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
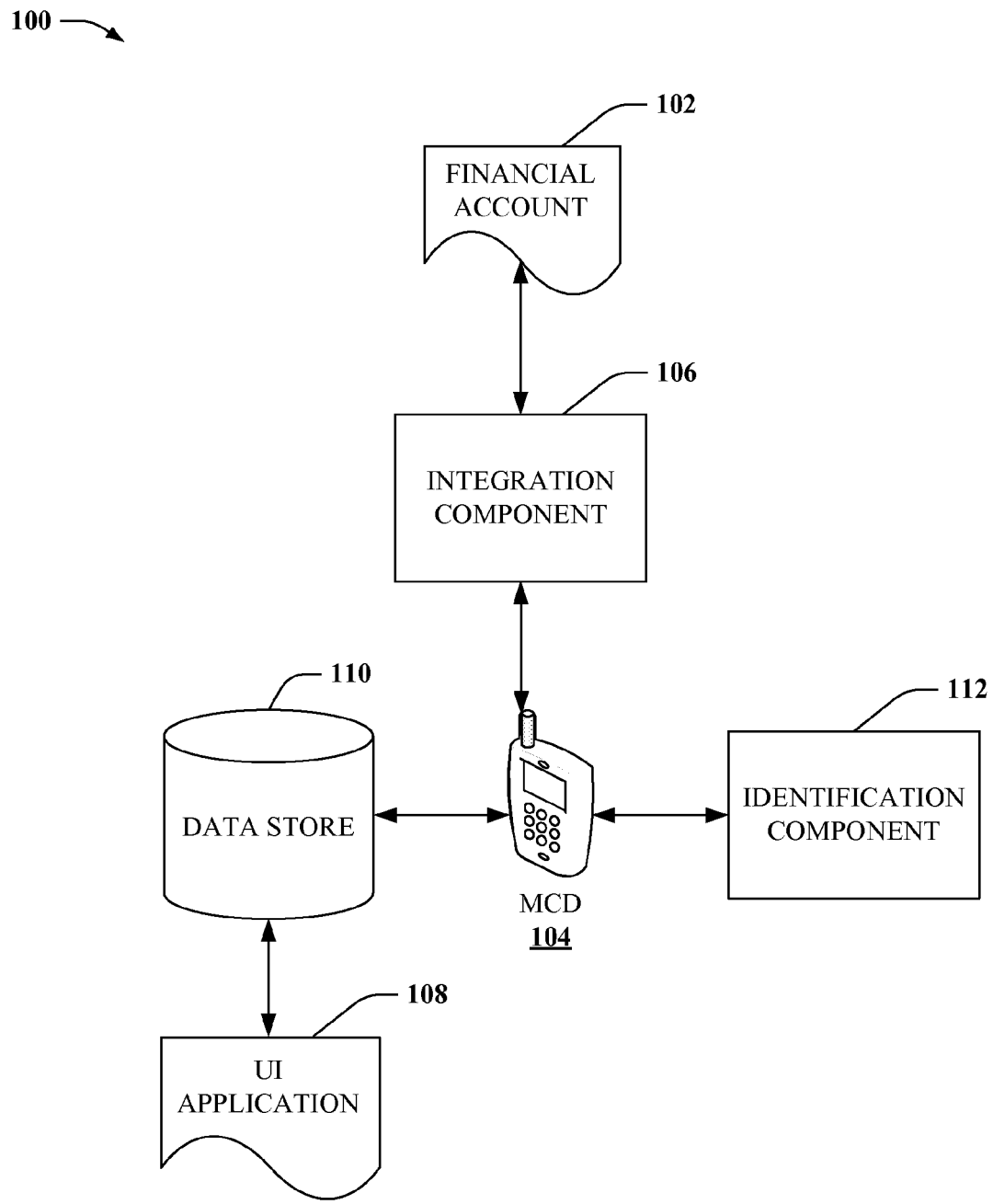
FIG. 1 illustrates a block diagram of a sample system that integrates personal identification and personal/business accounts, histories, or associations with a mobile communication device (MCD).

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) can be practiced without these specific details. In other instances, well-known structures and devices are shown in block diagram form in order to facilitate describing one or more aspects.

In addition, it should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are descried in the context of an ad-hoc or unplanned/semi-planned deployed wireless communication environment that provides synchronized transmission and retransmission of SFN data. One skilled in the art should appreciate that similar techniques could apply to other communication environments.

Referring now to FIG. 1, depicted is a block diagram of a sample system 100 that can integrate at least financial account information (102) with an MCD 104. The financial account information (102) can be associated with one or more users of the MCD 104. Further, the system 100 can identify a concurrent user of the MCD 104 and condition access to a financial account 102 based at least on the identity of the concurrent user. Accordingly, system 100 can uniquely identify a device user and enable a user to conduct financial transactions associated with an account 102 at the MCD 104. As a result, traditional mechanisms for identification and account access can be substituted or augmented by the MCD 104.

According to particular aspects, system 100 can include an integration component 106 that can associate a financial account 102 with an MCD 104. The financial account 102 can be any suitable account including a checking account, savings account, credit account, money market account, certificate of deposit (CD) account, or a combination thereof or of like accounts. The account 102 can be sponsored, managed, or maintained by a financial or commercial entity, for instance, such as a bank (e.g., Wachovia bank), lending institution, business, corporation (e.g., Starbucks) and so on. Furthermore, the financial account 102 can be owned by/designated to/entrusted to a person(s) (including, e.g., a legal person such as a corporation) who can access the account by way of the MCD 104. In addition, one or more other individuals can be designated by the person(s) to act on their behalf in accessing the account 102. Access can be by way of a user interface (UI) application 108 on the MCD 104, for instance.

In addition to the foregoing, system 100 can include a data store 110 that can save transaction and balance information related to the financial account 102. Further, the data store 110 can contain an account UI application 108 that provides an interface to the financial account 102 for a user of the MCD 104. Moreover, the data store can contain information associated with one or more users of the MCD 104 suitable to uniquely identify such user(s). The information can include a username and password, finger/thumb print scan information or retinal scan information, or a combination of these or like mechanisms that can uniquely identify a user of the MCD 104. Such information can further be cross-correlated to the financial account 102, and can define access rights to the financial account for one or more such users.

According to still other aspects, system 100 can include an identification component 112 that can verify an identity of at least one user of the MCD 104 and condition access to the financial account 102 and/or account UI application 106 based at least on verified identity. As a specific example, the identification component 112 can include a biometric identifier that employs biometric recognition to verify the identity of a concurrent user(s) of the MCD 104. The biometric identifier can be a thumb/finger print scanner, optical retinal scanner, voice recognition device, or the like. Alternatively, or in addition, the identification component 112 can employ a secure user interface (108) with which a user can provide username and/or password information that can identify the user. Identification component 112, therefore, receives information about a concurrent user suitable for uniquely identifying that user. Such information can include a private username and password associated with the user, finger/thumb print scan information, retinal scan information, voice recognition information, and/or the like (e.g., extracted by the biometric identifier or secure user interface [108]).

Upon receiving information from a concurrent user, system 100 can reference data store 110 to determine whether the received information matches any ID information stored thereon. For example, if the received information matches predetermined information that uniquely identifies a predetermined user, then system 100 can authenticate the concurrent user as the predetermined user. If such user is authorized to access and/or utilize the financial account 102, such access/utilization can be provided by way of the UI application 108. The UI application 108 can assist the user in conducting remote financial transactions, verifying user identity with various electronic servers and personal, business, educational, or government identification applications, for instance, and so on as described herein. Accordingly, system 100 can provide an alternate mechanism (e.g., MCD 104) for identifying a user (e.g., by name, by social security number, drivers license number, and so on) with such personal, business, educational, and/or government entities, or with like entities.

According to particular aspects, system 100 can provide varying levels of access to the financial account 102 for different users. A first user can be accorded read-only access, for instance, to view financial transactions associated with the financial account 102 but not to modify such transactions or engage in additional transactions. A second user, an owner of the financial account 102, can be provided full access and therefore can read financial transaction information as well as conduct transactions over the MCD 104 with remote entities (e.g., an ATM, a suitable cash register at a commercial store, another MCD, and so on). Consequently, a financial account 102 associated with a business can be accessed to varying degrees by employees, officers, or other designees, of the business. As described, system 100 can provide user identification and interaction or manipulation of a financial account by way of MCD 104.

As used in this application, the terms "component," "system," "interface," "mechanism," and the like, are intended to refer to a computer and/or electronic-related entity, either hardware, software, software in execution, firmware, middleware, microcode, and/or any suitable combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Moreover, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a mobile communication device (MCD). An MCD can also be called a subscriber unit, mobile station, mobile, remote communication device, or personal electronic device. A subscriber station can be a cellular telephone, a cordless telephone, a Session Initiation Protocol (SIP) phone, a multi-mode phone, a smart-phone, a personal digital assistant (PDA), a handheld device having remote connection capability (e.g., wired or wireless such as licensed cellular radio frequency [RF], unlicensed wireless, general RF transmission, optical transmission, and so on). In addition, the MCD can include any suitable processing device connected to a wireless modem, RF transceiver, optical transmitter or transceiver, or similar mechanism facilitating wireless communication with another processing device.

In addition to the foregoing, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 2:
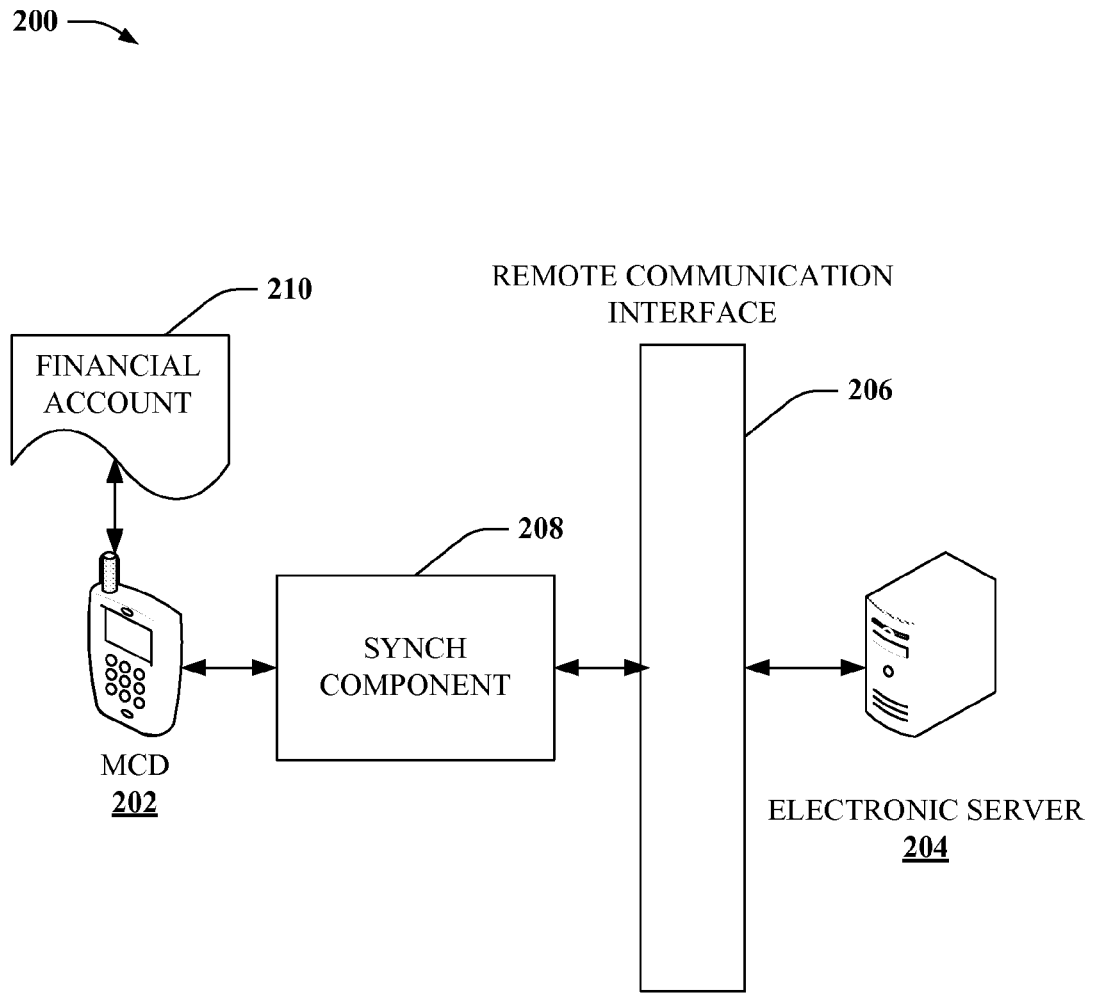
FIG. 2 depicts a block diagram of an example system that interfaces an MCD and a remote electronic server according to various aspects.

Referring to FIG. 2, depicted is a block diagram of an example system 200 that can interface an MCD 202 and a remote electronic server 204 according to various aspects. System 200 can enable the MCD 202 to conduct financial transactions with and/or provide user identity to such remote electronic server 204, for instance. Any suitable mechanism (206) for communicatively coupling the MCD 202 a remote electronic device (204) can be included as part of system 200. Accordingly, system 200 can enable the MCD 202 to conduct personal and/or business transactions over a remote communication interface 206 with any suitable electronic server 204.

According to particular aspects, system 200 can include a synchronization component 208 that communicatively couples the MCD 202 and an electronic server 204. As a specific example, the electronic server 204 can be related to an entity (not depicted) that sponsors a financial account 210 associated with the MCD 202. Consequently, synchronization component 208 can enable the financial account 210 to interface with the server 204. Such an interface can enable the sponsoring entity to manage the account 210, provide transaction authorization for the account 210, balance the account 210, and/or provide billing/transaction summary information to an owner of the account 210. According to other aspects, the synchronization component 208 can enable a user of the MCD 202 to request a credit line increase for the financial account 210, obtain/verify transaction history information, deposit funds into the account 210, pay a balance on the account 210, or the like. It should be appreciated that any suitable interaction between an account holder and a sponsoring entity related to the financial account 210 can be conducted by way of the synchronization component 208 and MCD 202.

According to further aspects, the synchronization component 208 can utilize any suitable remote communication interface 206 to couple the devices (202, 204). The remote communication interface 206 can be a mobile network or cellular network, for instance. As another example, the interface 206 can be a data network (e.g., the Internet or a private intranet) that includes wired or wireless access thereto. In addition, the interface 206 can be a radio frequency (RF) or optical frequency transmitter/receiver pair located at the MCD 202, the electronic server 204 or both. Alternatively, or in addition, the interface 206 can include a combination of such coupling mechanisms. More specifically, a data network (206) can be accessed at least in part by way of a wired connection such as an Ethernet connection, a digital subscriber line (DSL) connection, a co-axial cable connection, or the like, between the devices (202, 204) and the data network (206). Alternatively, or in addition, access to such data network (206) can be at least in part by way of a wireless connection, including a radio frequency (RF), microwave frequency, optical frequency or like wireless connection. The interface 206 can be coupled to the electronic server 204 by any of the foregoing mechanisms or by substantially similar connections, or a combination thereof. As described below, various additional personal and/or business applications related to user identity and/or financial transactions can be conducted by way of the synchronization component 208 and/or remote communication interface 206. Accordingly, a great many of the interpersonal and business activities performed by an individual can be consolidated onto an MCD 202.

Figure 3:
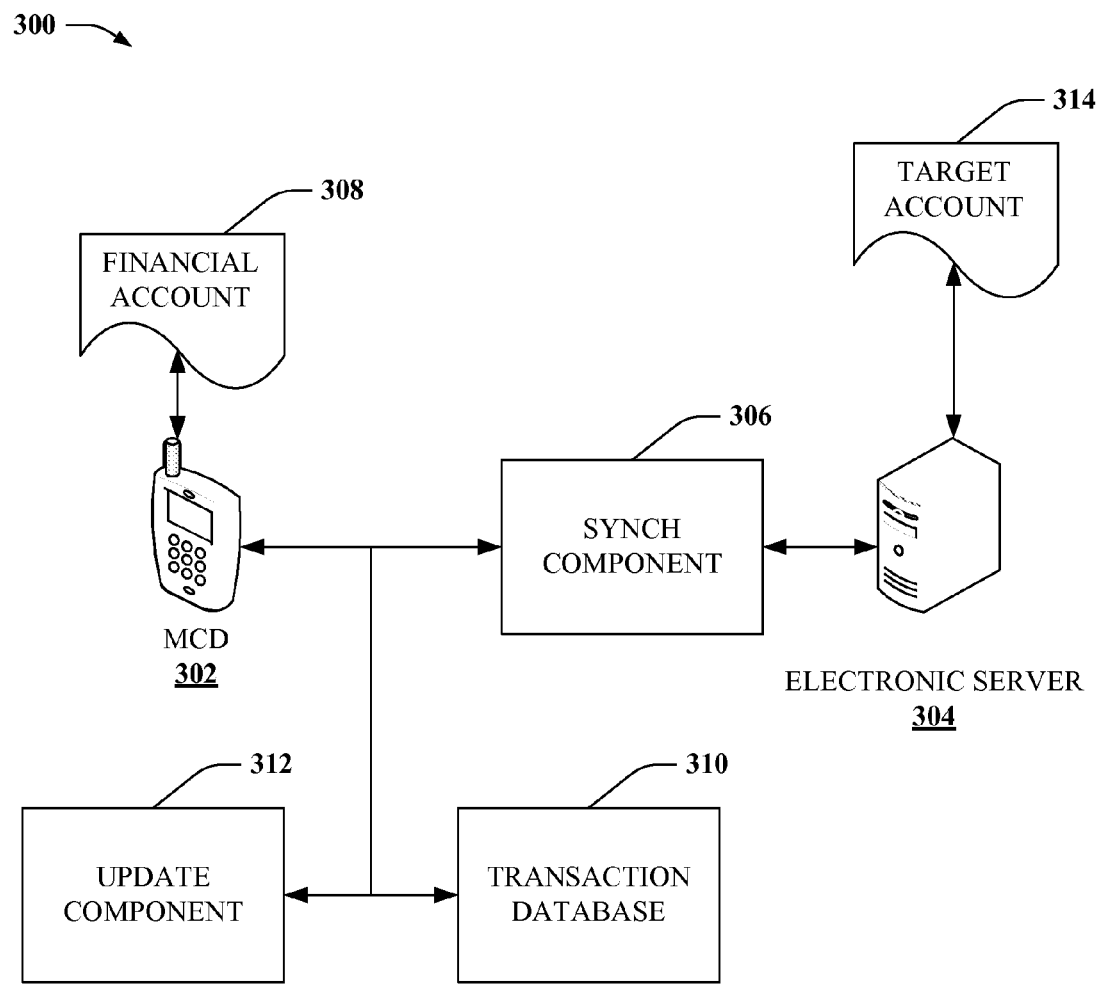
FIG. 3 illustrates a block diagram of a sample system that can facilitate and synchronize financial transactions at an MCD and a remote server or device.

FIG. 3 illustrates a block diagram of a sample system 300 that can facilitate and update financial transactions at an MCD 302 and a remote electronic server or device (304). System 300 can connect the MCD 302 and electronic server 304 by way of a synchronization component 306 (including, e.g., a remote communication interface), as described above with respect to FIG. 2 for instance (e.g., over the Internet, a cellular network, or the like). Transactions associated with a financial account 308 can be conducted at the MCD 302 (or, e.g., at the electronic server 304) and synchronized with the electronic server 304 (or MCD 302) and with an account (314) associated with such server 304, as suitable. Accordingly, system 300 can enable electronic purchases, payments, balance transfers, or exchange of funds, or a combination of these or like activities between an MCD and another electronic communication device.

According to particular embodiments, system 300 can include a transaction database 310 that can provide rules for conducting a transaction related to the financial account 308 at the MCD 302. The synchronization component 308 can consult the transaction database 310 in order to determine whether a particular transaction is permissible. For instance, if a user of MCD 302 initiates a purchase with a remote electronic server (304) (e.g., associated with an online purveyor books and videos), synchronization component 308 can determine whether the purchase is permitted by a governing financial institution (not depicted) providing the financial account 308. As a more particular example, if a user initiates a purchase of a book at the electronic server that costs $45, synchronization component 308 can reference the transaction database 310 and determine that such transaction is permissible only if the financial account 308 has a positive balance of at least $45. In such case, synchronization component 306 can reference the financial account 308 and determine whether such a balance exists. If so, synchronization component 306 can permit and facilitate the purchase of the book.

It should be appreciated that system 300 can verify an identity of a user of the MCD 302 in order to authenticate and provide access to the financial account 308 (e.g., as described with respect to FIGS. 1 and 2, supra). In addition, the synchronization component 306 can verify the identity of the user, as suitable, at the electronic server 304 in order to conduct the transaction discussed above. Accordingly, system 300 can serve as a mechanism for identifying the user of the MCD 302, authenticating the user to the financial account 308, and facilitating a transaction with a remote device (304) for such user.

According to other aspects of the subject disclosure, system 300 can include an update component 312 that synchronizes information related to a financial transaction at the MCD 302 and the electronic server 304. The information can be synchronized by way of a communication interface between such devices (302, 304) provided by the synchronization component 306 (e.g., via a remote communication interface). To continue the foregoing example, if synchronization component 306 conducts a financial transaction to purchase the $45 book at the electronic server 304, update component 312 can synchronize details of the transaction at the MCD 302 and the electronic server 304. Particularly, update component 312 can debit the financial account by $45 and add $45 to an account (314) associated with the electronic server 304, for instance.

As an additional example, update component 312 can review financial history information (e.g., stored at a data store 110 as depicted at FIG. 1, supra) for the financial account 308 and update related servers and/or devices (304) associated with the account 308. For instance, update component 308 can review information related to the financial account at a server (304) of an entity sponsoring the account, and compare transaction-related information or the like at the server (304) and MCD 302. If a transaction stored at the MCD 302 is not represented at the server (304), update component 312 can synchronize the server (304) with the MCD 302 and write any missing information to the server 304 (and/or MCD 302). Accordingly, system 300 can update a sponsoring entity associated with the financial account 308 if a contemporaneous connection with such entity is not available when a financial transaction is conducted by system 300.

Figure 4:
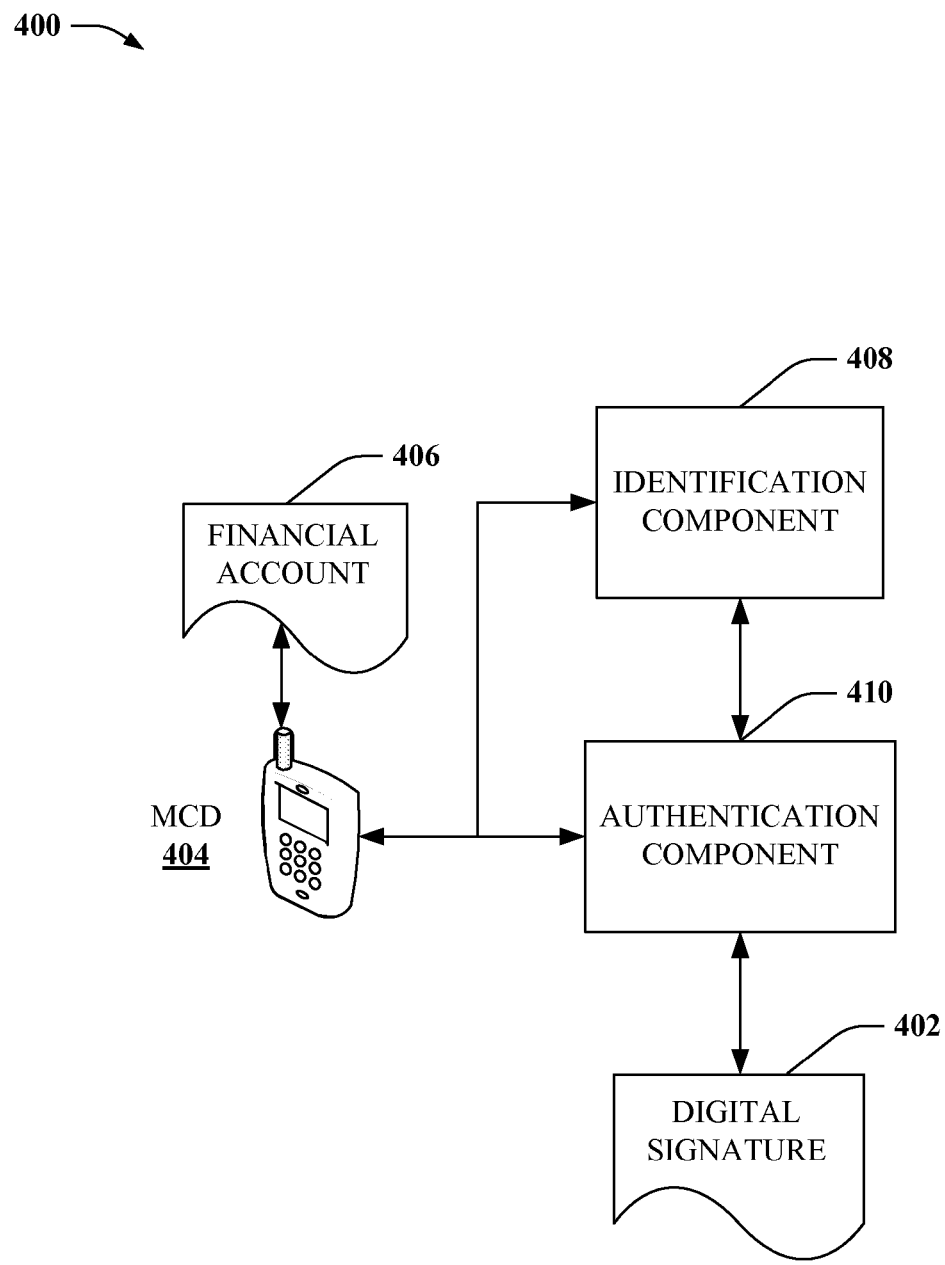
FIG. 4 depicts a block diagram of an example system that can provide a digital signature of a user of an MCD according to particular aspects.

FIG. 4 illustrates a block diagram of a sample system 400 that can provide a digital signature 402 of a user of an MCD 404 according to particular aspects. System 400 can authenticate an identity of a user of the MCD 404 as described herein. A verified identity can be utilized to authenticate access for one or more users to one or more financial accounts (406) associated with the MCD 404. Particular remote transactions (e.g., electronic server 304 depicted at FIG. 3, supra) can require a digital signature of a user in order to proceed with the transaction. To facilitate such transactions, system 400 can provide a digital signature for a user(s) of the MCD 404.

According to one or more aspects, system 400 can include an authentication component 408 that can provide a digital signature for at least one user of the MCD 404 based on a verified identity of such user(s). For instance, an identification component 410 can receive information associated with the user that can uniquely identify such user (e.g., as described with respect to FIG. 1, supra). Once a user is identified, the identity can be forwarded to the authentication component 410.

Authentication component 410 can facilitate generation and use of a public/private key pair for encrypting digital communication sent by the MCD 404. For instance, a first algorithm can be utilized to generate a private, or secret, key and associate the private key with transmitted electronic communication, as a signature for such communication. A second algorithm can generate a public key tied to a user of the MCD 404 by personal information of such user (e.g., including phone number, address, name, and/or the authentication information generated by identification component 408). The public key can be used to verify the signature generated by the private key and decrypt information encrypted with the private key. In such a manner, system 400 can provide a digital signature for a user of MCD 404 to facilitate a remote transaction requiring such digital signature.

As described above, system 400 can facilitate securely transmitting information over a remote interface by way of authentication component 410. Information sent by the MCD 404 can be trusted with a higher degree of reliability. For instance, applications requiring a high degree of authenticity can trust identity information provided by MCD 404. As a result, the MCD 404 can server as a record of state or federal ID for one or more users, including a drivers license, passport, a general state or federal ID, and so on. The MCD 404 can also store a picture of a particular user, and provide the picture to an external entity (406) for additional verification of user identity (e.g., visual verification). Consequently, system 400 can provide a secure and reliable mechanism for establishing identity of a user of the MCD 404.

Figure 5:
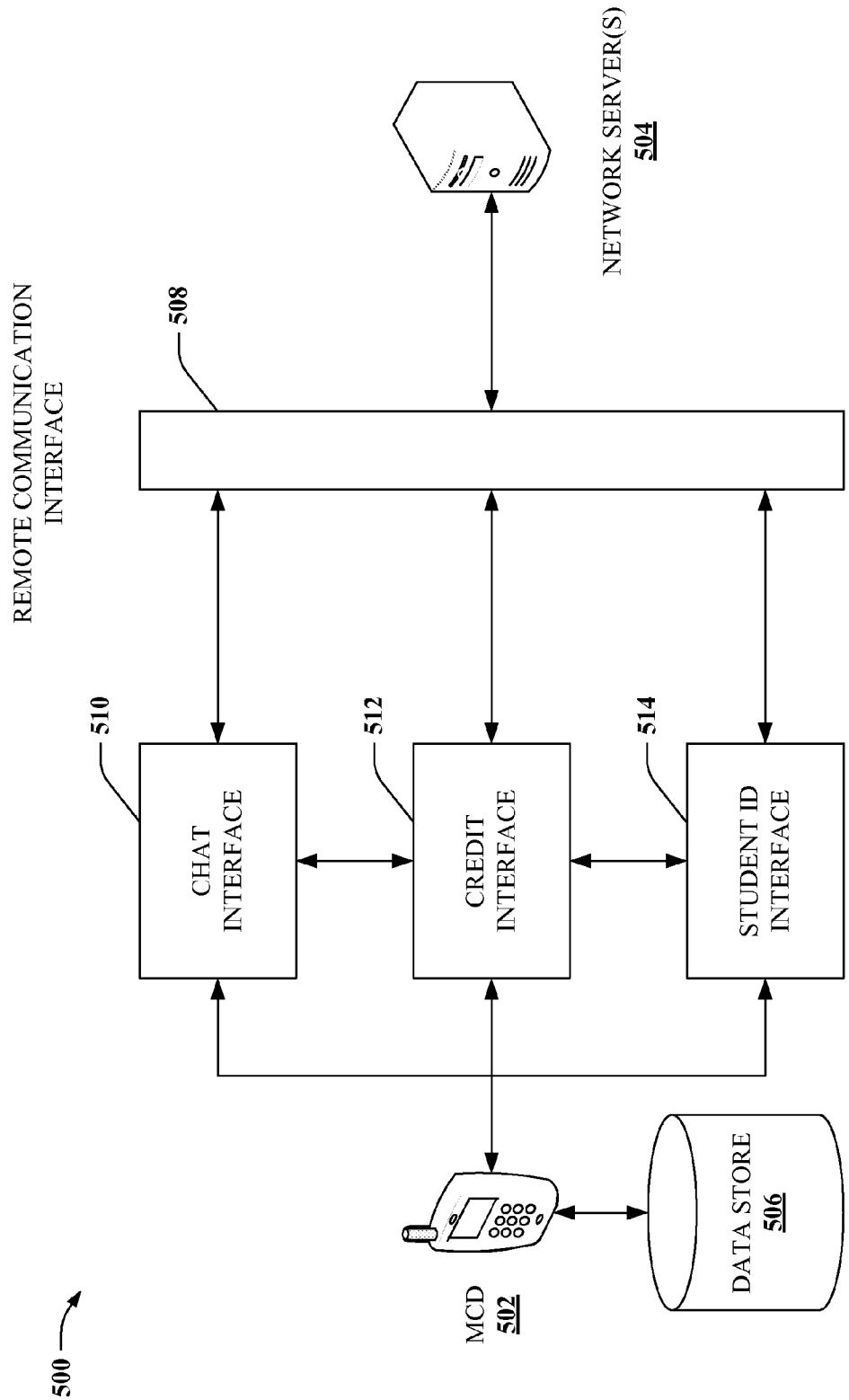
FIG. 5 depicts a block diagram of a sample system that can identify a user of an MCD over various remote and/or online application servers.

FIG. 5 illustrates a block diagram of a sample system 500 that can identify a concurrent user of an MCD 502 in conjunction with various remote and/or online application servers 504. The MCD 502 can receive information associated with the concurrent user that can uniquely identify such user. The received information can be matched to predetermined information maintained in a data store 506 to match the concurrent user with a predetermined user. In addition, information related to account, membership, or insurance or medical information applications, which utilizes an identity of a person in order to associate appropriate information with such person, can be stored at the data store 506 and utilized in conjunction with the identity of the predetermined user. MCD 502 can therefore interact with such applications (504) (e.g., by way of a remote communication interface 508) and verify an identity of such user(s) of the MCD 502 as required by such applications.

According to particular embodiments, system 500 can include an online chat interface 510 that connects the MCD 502 to a network chat server (504), and enables the MCD 502 to verify an identity of the at least one user of the MCD 502 on the network chat server (504). The connection can be by way of any suitable remote communication interface 508 (e.g., the Internet) as described herein and/or known in the art. An online chat server (504) can provide a platform for exchange of digital information for one or more devices (502) communicatively coupled with the chat server (504). Such exchange can also utilize an identities (e.g., username, chat handle, and so on) of users connected by way of such devices (502) to direct the digital information from one or more senders to one or more intended recipients. For instance, conventionally users of a chat server could establish a username and password with the chat server (504) and log in to the chat server (504) as a particular user by supplying the username and password. System 500 can enable an MCD 502 to store username and password information at a data store 506 and automatically supply the username and password information for a particular user of the MCD 502 when a connection is established between the MCD 502 and online chat server (504) via the online chat interface 510. More generally, because the MCD 502 can uniquely verify identity of a user of the MCD 502, such identity can be supplied to the chat server (504) in order to associate the user with a chat username, handle, or the like.

According to other aspects, online chat interface 510 can require an encrypted digital signature in order to verify an identity of a user at a chat server (504). For instance, if such a chat server facilitates exchange of secret, encrypted information, it can be desired to verify identity of a user logged into the chat server (504) with a relatively high degree of accuracy. In such a case, system 500 can incorporate a digital signature of the user (e.g., as described at FIG. 4, supra) in conjunction with data transmitted by the online chat interface 510 to the chat server (504). As a result, the chat server (504), and users logged into such server (504), can trust an identity of the user of MCD 502 to a higher degree of accuracy.

According to further aspects of the subject innovation, system 500 can include a credit interface 512 that can couple the MCD 502 with a networked credit server (504) (e.g., an online credit history database) and retrieve credit history information for at least one user of MCD 502. The credit interface 512 can be any suitable mechanism for coupling two or more remote devices over a network. The MCD 502 can verify the identity of the user(s) and provide identity information for the user(s) to the online server (504). For instance, information that can be utilized to reference financial/credit transaction history of the user(s) (e.g., social security number, state or federal ID, or the like) can be stored at a data store (506), and forwarded to the online server (504) by way of the credit interface 512. Accordingly, the online server (504) can then retrieve such credit history information and return it to the MCD 502.

According to additional embodiments, system 500 can include a student ID interface 514 that can couple the MCD 502 with an electronic server (504) of an educational institution and verify a student ID of at least one user. Data store 506 can maintain a list of applicable student identification information for one or more users of the MCD 502. When the user(s) is identified by the MCD 502, as described herein, and an electronic server (504) of an educational institution (or, e.g., any suitable entity that can utilize student ID information to identify information associated with a particular user) is coupled to the MCD 502, the identity of the user(s) along with appropriate student ID information can be forwarded to such server (504). As a result, MCD 502 can retrieve class schedule information, grade information, tuition balance and payment information, access a class scheduling application, and so on, associated with a student from the electronic server (504) of an educational institution.

Figure 6:
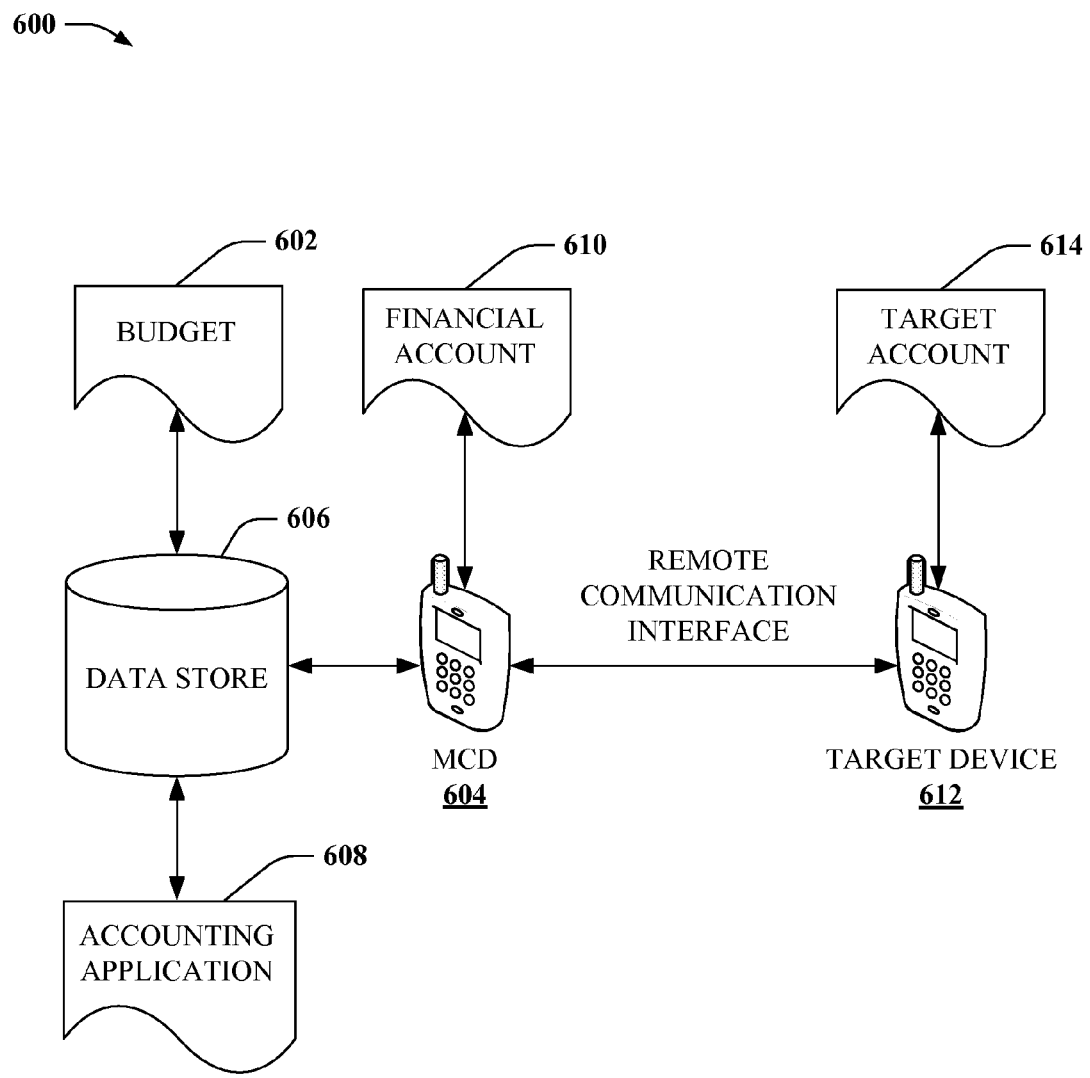
FIG. 6 illustrates a block diagram of an example system that can provide dynamic accounting and budget services for a user of a MCD.

FIG. 6 illustrates a sample system that can utilize a budget (602) of a user of an MCD 604 and provide accounting information and advice related to an initiated or proposed transaction. For instance, a user(s) can store information related to a personal or business budget 602 (e.g., income, current balance, monthly bills, debts, liabilities, and so on) at a data store 506 associated with the MCD 504. The MCD 604 can identify a user, as described herein, when a user logs onto and/or activates the MCD 604. Once a user is identified, system 600 can reference stored budget 602 information as desired by the user.

In addition to the foregoing, an accounting application 608 stored at the data store 606 of MCD 604 can organize information related to a financial account 610 associated with the MCD 604 and a personal or business budget 602 of a user(s) and provide advice for a proposed or initiated transaction based at least on a state of the personal or business budget 602. More specifically, the accounting application 508 can access the budget 602 information and apply predetermined and/or user established guidelines to proposed and/or initiated financial transactions. The accounting application 608 can then determine a consistency of the financial transaction in view of such guidelines and budget 602, and provide feedback to the user(s) regarding the transaction and budget.

As a particular example, MCD 604 communicatively couples with a target device 612 to engage in a financial transaction. The transaction can involve the financial account 610 associated with the MCD 604, as well as a target account 614 associated with the target device 612. As a simple case, the accounting application 608 can have a default guideline that no transaction should take a balance of the financial account 610 below a threshold balance (e.g., $500—such as a minimum balance of a checking account). If the accounting application determines that the financial account 610 will have a surplus of $1500 after income is received and bills are paid, for instance, then any transaction between accounts (610, 614) involving a debit of $0 to $1000 to the financial account 610, or a credit, would be within budget. The accounting application 608 could announce that a proposed/initiated transaction is within budget under such circumstances. However, a transaction resulting in a debit of $1001 to $1500 dollars could take the financial account 610 out of budget, under the established guidelines, and feedback can be provided in regard to such transaction. Further, a transaction greater than $1500 can put the financial account 610 into a negative balance, and the accounting application can also indicate this result in appropriate circumstances. Additionally, such application 608 could determine whether credit is available to the account 610 in order to determine whether a negative balance is available for such account 610. The application could, for instance, attempt to negotiate a credit line increase for the account 610 in order to facilitate a proposed/initiated transaction (e.g., by way of a connection with a remote server of a lending institution, as depicted at FIG. 2 or 3). Various other accounting scenarios can be managed by the accounting application 608 as well, as known in the art or made known to one of skill in the art by way of the example(s) provided herein.

It should also be appreciated that the financial account 610 and/or target account 614 can be a checking account, savings account, credit account, and so on. Further, the target device 612 can be a second MCD, an electronic cash register, an ATM, an electronic server of a bank, or the like or a combination thereof. As a result, system 600 can facilitate remote transactions with various private or commercial entities and provide budget advice for a user of an MCD 604 in conjunction with such transactions.

Figure 7:
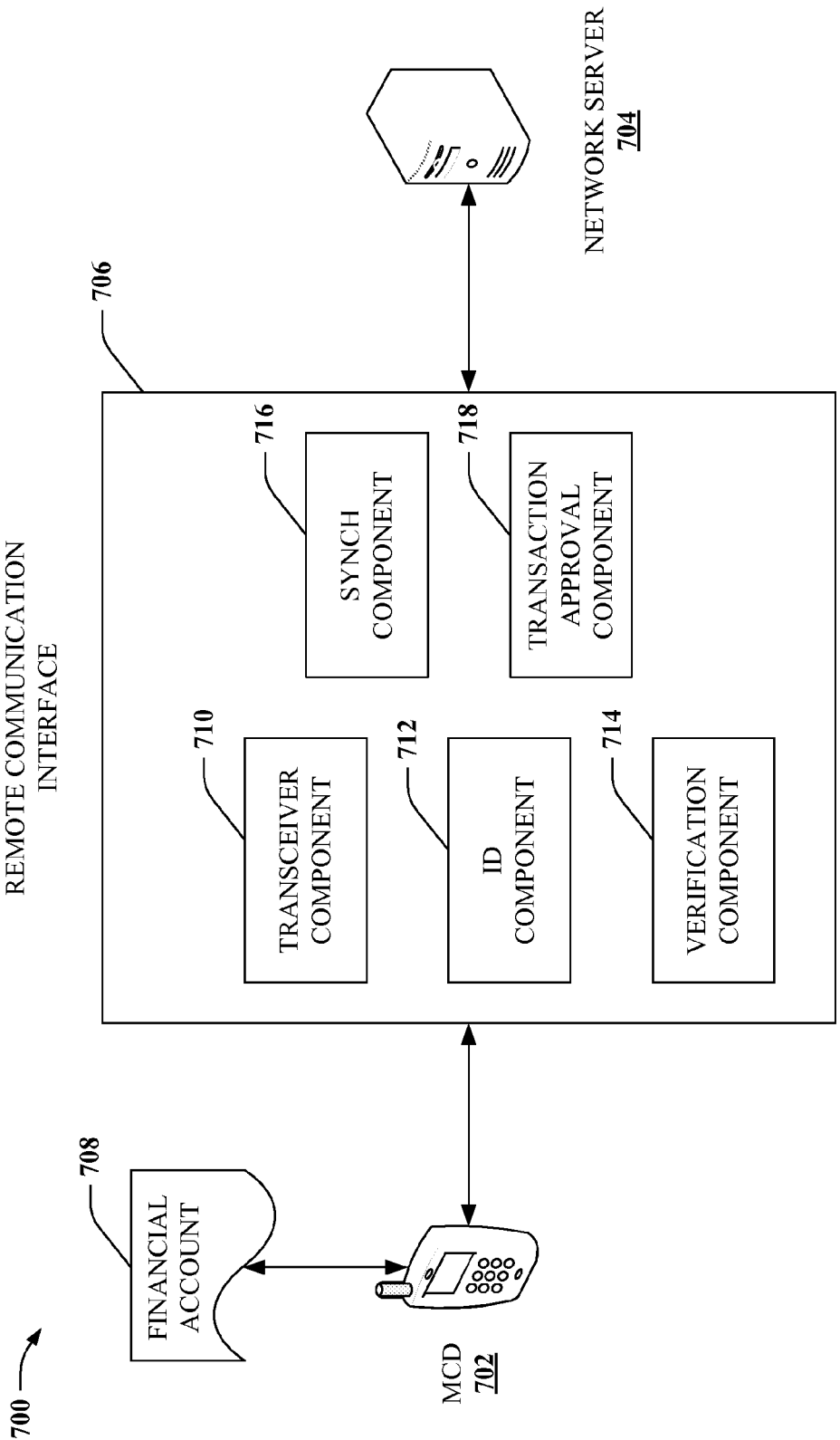
FIG. 7 illustrates a block diagram of an example system that can facilitate identification of an MCD user and remote transactions at components of a remote communication interface.

FIG. 7 illustrates a block diagram of a sample system 700 that can facilitate identification of an MCD user and remote transactions at components (710-720) of a remote communication interface 706. System 700 can facilitate such identification and transactions for any suitable MCD 702, as described below. Accordingly, system 700 can facilitate user identification for various MCD 702 devices that have limited capability to identify a user(s) of such device, and facilitate remote transactions based on such identity.

System 700 can include a remote communication interface 706 that couples a MCD 702 with a remote electronic server 704. The remote communication interface 706 can be any suitable interface for remote electronic communication described herein or known in the art (e.g., cellular network, data network, RF or optical frequency transmitter, receiver and/or scanner and so on). Particularly, interface 706 can include a means for receiving (710) a request to initiate a remote financial transaction from an MCD 702 associated with a financial account 708. Such means for receiving can be a transceiver component 710 that can send and receive digital information via a wired and/or wireless communication interface (706). The means for receiving the request can facilitate initiation of a financial transaction between the devices (702, 704).

In addition, interface 706 can include a means for receiving information (712) that verifies identification of a user of the MCD 702. The means for receiving information (712) can be an ID component 712 that interrogates the MCD 702 for information uniquely identifying a concurrent user of the MCD 702. For instance, the ID component 712 can request and receive biometric identification information determined at the MCD 702 as described herein. Alternatively, or in addition, the ID component 712 can request a unique username, password, etc., associated with a particular user of MCD 702 in order to verify identity of such user. The ID component 712 can maintain a list of user identities and username/password etc., combinations in order to associate a particular identity with received identification information. Once user identity is established, transactions that rely on such identity can be conducted.

According to additional aspects, system 700 can include a means for corroborating information (714) that verifies user identity at an electronic server or database 704 associated with a financial account (708). For instance, a verification component 714 can receive user identity information from the ID component 712. If a communication between devices (702, 704) involves a financial transaction related to a financial account 708, verification component 714 can reference a server (704) of a financial institution, lending agency, commercial bank, and so on, that sponsors the financial account 708. If such server contains identity information associated with a user of the account 708, the user identity information received from the ID component 712 can be cross-correlated at the server of such financial institution (704). Therefore, devices (704) interfacing with the MCD 702 can trust user identity to a higher degree of confidence.

System 700 can also include a means for synchronizing (716) the MCD and the electronic server or database that updates transaction information, associated with the financial account (708), at the MCD 702 and the electronic server or database 704. For instance, a synchronization component 716 can interrogate the MCD 702 to determine stored transaction history information related to the financial account 708. In addition, the synchronization component 716 can interrogate a server (704) of a sponsoring financial entity associated with the financial account 708 for related information. Synchronization component 716 can determine if any incongruity in information related to the account 708 exists. If so, information can be updated at one or both devices (702, 704), or an error can be generated and provided to such devices (702, 704) indicating that account information is out of balance. For instance, if a prior transaction (e.g., a purchase) related to the financial account 708 is stored at the MCD 702 but not at the financial server (704), then synchronization component can generate such error and/or update the financial server (704) to reflect the missing transaction, where appropriate. Consequently, system 700 can at least provide a mechanism to update various remote data stores containing information related to a common account (708).

According to still other aspects, system 700 can include a means for approving a financial transaction initiated at the MCD 702 for the financial account 708. For instance, a transaction approval component 718 can reference a transaction rule set at an electronic server or database (704) associated with the financial account 708. Such a rule set can provide guidelines for permissible and impermissible financial transactions for the financial account 708. As an example, the rule set can establish that any transaction that would take the account 708 into a negative balance would be impermissible. Consequently, if a user initiates a transaction at the MCD 702 with a remote device (704), transaction approval component 718 can reference the account 708 and determine whether the transaction will put the account into a negative balance. If so, transaction approval component 718 can deny the transaction, in accordance with the rule set. It should be appreciated that any suitable rule(s) for governing financial transactions can be stored at such a network server 704, referenced by transaction approval component 718, and applied to a remote transaction as discussed herein.

In general, system 700 can facilitate transfer of ID information associated with one or more users of the MCD 702 to a remote application operating on a network server 704. The remote application can be related to a government, educational, financial, or like institution, containing personal and/or business information for individuals. Such information associated with one individual can typically be distinguished from information associated with another individual by ID information. For instance, a social security number of a person can typically be utilized to identify and return credit history information associated with such individual. Further, a driver's license number can be utilized to reference state bureau of motor vehicle information regarding the individual, and so on. In general, system 700 can interface an MCD 702 with a networked server 704 that utilizes ID information of a user(s) to provide extract information stored by an application at the networked server 704.

As a more specific example of the foregoing, system 700 can facilitate retrieval of credit history, government record(s), financial transaction history, or the like, associated with a financial account(s), or an employment history of the user, or a combination of these or like records. System 700 can obtain such records from an appropriate application operating on an appropriate network server 704 (e.g., credit reference server, state or federal agency server, financial institution server, and so on). Where appropriate, system 700 can utilize information verified at an MCD 702 to act as a particular form of user identity, such as a passport, student ID, or state or federal ID for the user, or a combination thereof.

As an example to illustrate the foregoing, a data store associated with the remote communication interface 706 can securely store a passport number associated with a user upon authenticating such user with the interface (706). Upon verifying an identity of the user, as described above, the interface (706) can provide user ID and passport information to an electronic server (704) at a government customs agency, for instance. Likewise, additional information/applications can be referenced with such user ID information, including insurance information, medical information, membership information to one or more personal/business organizations, or financial account information associated with the user, or a combination thereof. The information can serve as a record of insurance, a record of medical history, a record of membership in an organization, or a record of account, respectively, or a combination thereof, for the user. Accordingly, system 700 can implement various ID related mobile wallet-type applications disclosed herein, utilizing logic and/or components at a remote communication interface 706 (e.g., a mobile network or data network) rather than or in conjunction with applications at the MCD 702.

Figure 8:
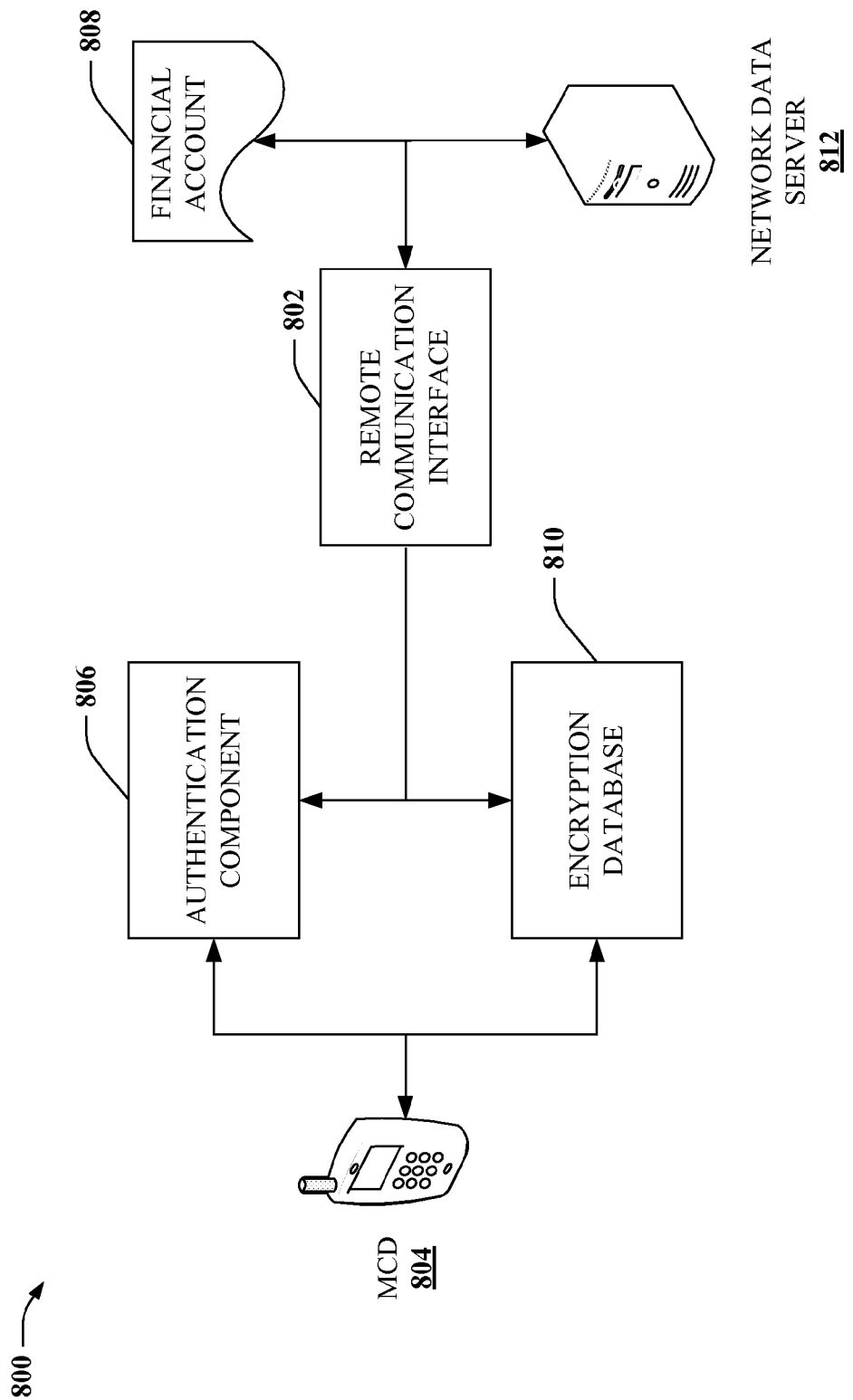
FIG. 8 depicts a block diagram of a sample system that provides secure communication over a remote communication interface.

FIG. 8 depicts an example system 800 that can provide secure communication over a remote communication interface 802. Remote communication can be subject to unauthorized access by third party devices (not depicted). Particularly, concerning remote financial transactions or exchange of private information, as described herein, security for remote communication can be desired to maintain integrity of such information and mitigate a likelihood that unauthorized users can access such information. System 800 can secure remote communication at least by encrypting transmitted data, so that private information is more difficult to extract from such transmission, and by requiring user authentication prior to transmission of private data on an MCD 804. It is to be appreciated that other mechanisms for securing remote transmissions and/or conditioning account access on appropriate identification, known in the art or made known to one of skill in the art by way of the context provided herein, are incorporated into the subject disclosure (e.g., see FIG. 4).

According to one or more aspects, system 800 can include an authentication component 806 that can condition access to MCD 804 and a financial account 808 associated with the MCD 804 upon providing suitable identification. For instance, authentication component 806 can require entry of a username and/or password onto the MCD 804. Alternatively, or in addition, biometric identification technology, such as a finger/thumb print scan device, retinal scan, and so on, can be employed by the MCD 804 to verify an identity of a concurrent user of the MCD 804. Further, information received from such scan and/or input, can be cross-referenced at the authentication component 806 for comparison with predetermined information associated with a predetermined user. If the received information matches predetermined information, a concurrent user can be authenticated as a predetermined user. Additional mechanisms known in the art for identifying an identity of a user at a MCD (804) can also be incorporated in addition to or as alternatives to those described above. As a result, system 800 can provide a degree of security by conditioning access to private information stored at an MCD 804, as described herein.

According to further aspects, system 800 can include an encryption database 810 that can encrypt and decrypt data transmitted and received over a remote communication interface 806. Particularly, encryption database 810 can cryptographically protect and/or digitally sign (e.g., see FIG. 4) data to decrease unauthorized, inadvertent and/or malicious access to transmitted data and private information (e.g., financial account information, insurance, medical, and/or organization membership information and so on). Encryption can essentially enable remote communication between the MCD 804 and a network data server 812, including affecting a remote financial transaction, sending/receiving credit information, insurance information, medical history information, and so on, to be protected.

Encryption database 810 can be used to cryptographically protect data during transmission and/or storage between devices (804, 812) or at a device (804, 812). For instance, an encryption algorithm can be employed to encode data. The algorithm is essentially a mathematical formula used to turn data into a secret code, unintelligible without access to a corresponding decryption formula or the like. For instance, an encryption algorithm can utilize a string of bits known as a 'key' to perform calculations pursuant to the mathematical formula. A larger number of bits in the key enable the formula to generate a greater number of alternative combinations, rendering the code harder to break and the encrypted data more secure.

A typical encryption algorithm can utilize a block cipher method, which codes fixed blocks of input that are typically from 64 to 128 bits (or more) in length. A decryption database 810 can be used to convert encrypted data back to an unencrypted form. According to particular aspects, a public key/private key pair (e.g., see FIG. 4) can be used to encrypt and decrypt data upon transmission and receipt, respectively, by the MCD 804 or financial account server 812. As described, system 800 can employ suitable mechanisms to secure data transmitted by the MCD 804 and/or financial account server 812 to mitigate unauthorized intrusion into an associated account 808.

The aforementioned systems have been described with respect to interaction between several components. It should be appreciated that such systems and components can include those components or sub-components specified therein, some of the specified components or sub-components, and/or additional components. For example, a system could include integration component 106, MCD 104, financial account 102, authentication component 806, encryption database 810, transaction database 310, synchronization component 306, electronic server 304, and target account 314, or a different combination of these and other components. Sub-components could also be implemented as components communicatively coupled to other components rather than included within parent components. Furthermore, it should be noted that one or more components could be combined into a single component providing aggregate functionality. For instance, update component 312 can include transaction database 310, or vice versa, to facilitate determining guidelines governing appropriate remote transactions and updating remote devices regarding such transactions by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 9:
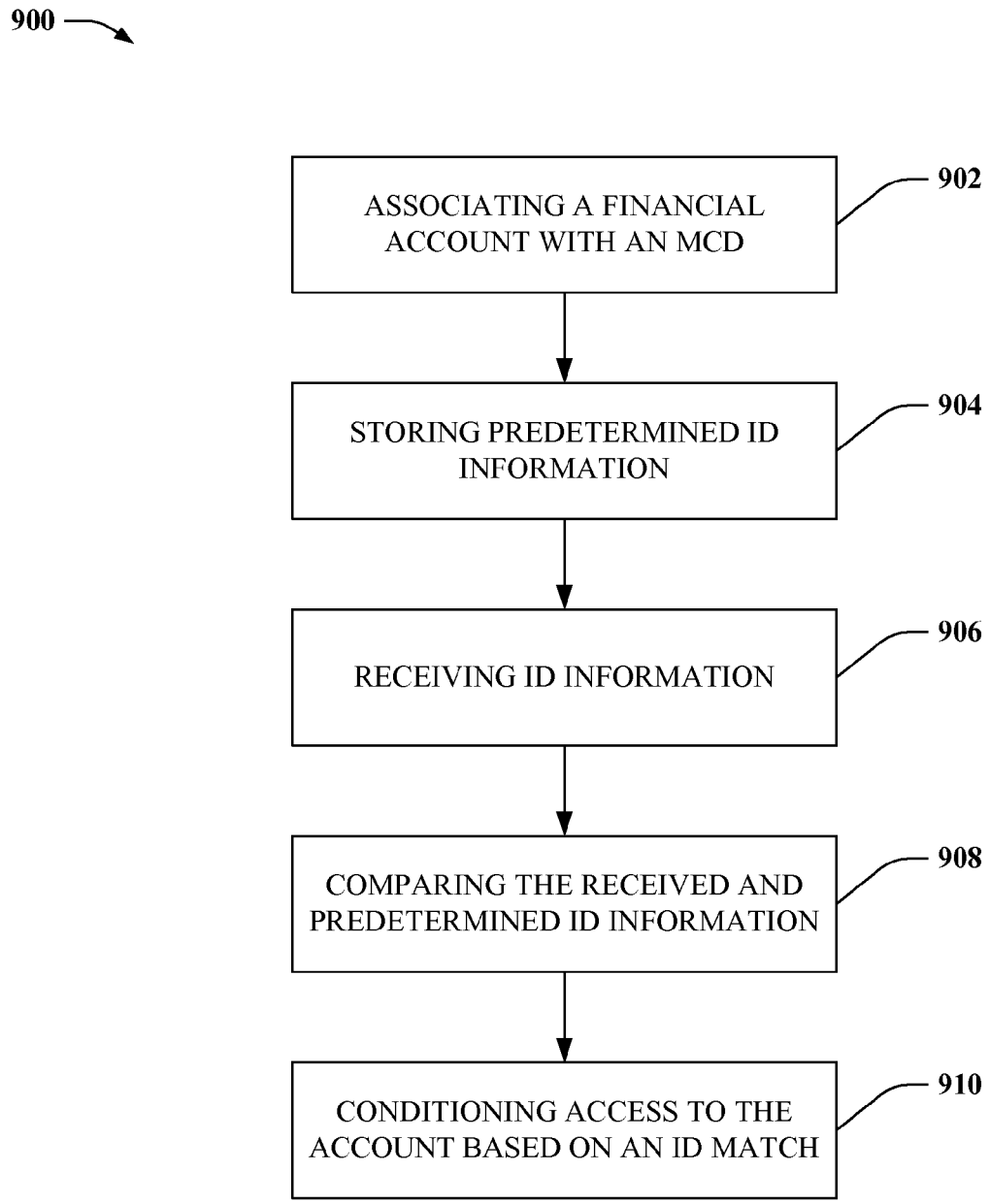
FIG. 9 illustrates a flowchart of an example methodology for providing identification and account information of one or more users at an MCD.

In view of the exemplary systems described supra, a methodology that can be implemented in accordance with the disclosed subject matter will be better appreciated with reference to the flow chart of FIG. 9. While for purposes of simplicity of explanation, the methodology is shown and described as a series of blocks, it is to be understood and appreciated that the claimed subject matter is not limited by the order of the blocks. For instance, some blocks may occur in different orders and/or concurrently with other blocks from what is depicted and described herein. Moreover, not all illustrated blocks may be required to implement the methodology hereinafter described. Additionally, it should be further appreciated that the methodology is capable of being stored on an article of manufacture to facilitate transporting and transferring such methodology to computers. The term article of manufacture, as used, is intended to encompass a computer program accessible from any computer-readable device, carrier, or media as well as computer hardware including gates, circuits, and transistors, or the like.

Referring now to FIG. 9, a flowchart of a sample methodology is depicted for providing identification and account information of one or more users at an MCD. Method 900, at 902, can associate a financial account with an MCD. The financial account can be any suitable account such as a checking account, savings account, credit account, money market account, CD account, or a combination thereof or of like accounts. In addition, the account can be owned by a predetermined user of the MCD. Thus, the user can access the account by way of the MCD and conduct remote financial transactions (e.g., utilizing a cellular network, the Internet, and so on) with remote entities (e.g., an online server, an ATM, an electronic cash register, etc.).

At 904, method 900 can store predetermined ID information associated with one or more users of the MCD. The ID information can uniquely identify a user as a predetermined user. For instance, a username and password and/or biometric scan information (e.g., finger/thumb print scan, optical retinal scan, voice recognition information, and so on) of a predetermined user can be extracted and/or received and stored. Subsequent received information can be cross-referenced with the stored information to determine whether a concurrent user of an MCD is the predetermined user.

At 906, method 900 can receive ID information uniquely identifying a concurrent user. At 908, the received ID information can be compared with predetermined stored information. If such received and stored information is a match, then an individual providing such information can be authorized as a particular user of a device (e.g., associated with the financial account, discussed above). At 910, access to the financial account can be conditioned on a match between the received ID information and the stored ID information. As a result, method 900 can determine that a concurrent user of a device is a predetermined user that owns the financial account associated with the MCD, and can provide access to such account based on the determination. Accordingly, method 900 can provide for establishing an identity of a user of an MCD and conditioning access to a financial account associated with the MCD based on such identity.

Figure 10:
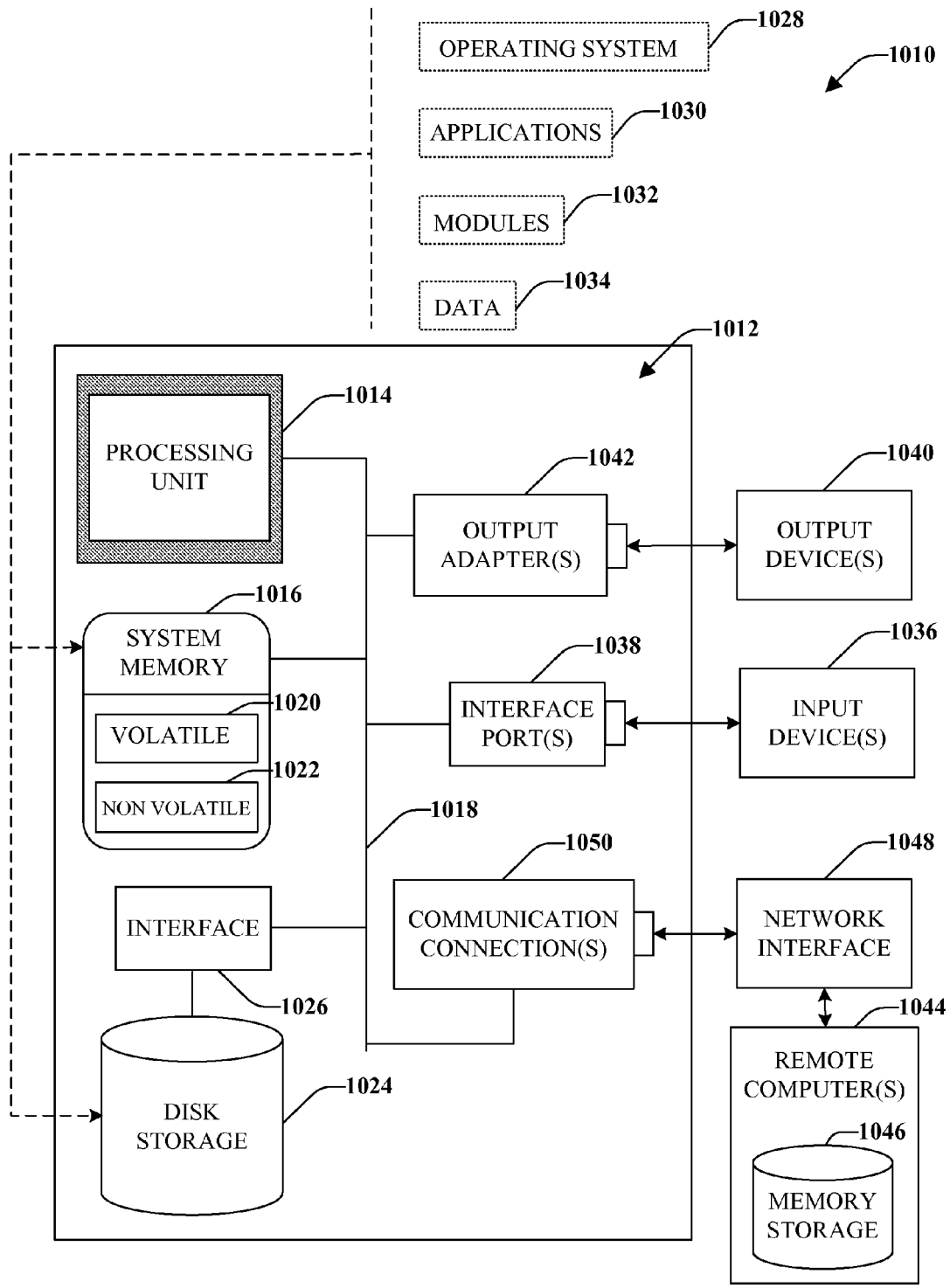
FIG. 10 depicts a block diagram of an example operating system suitable for implementing various aspects described herein.
Figure 11:
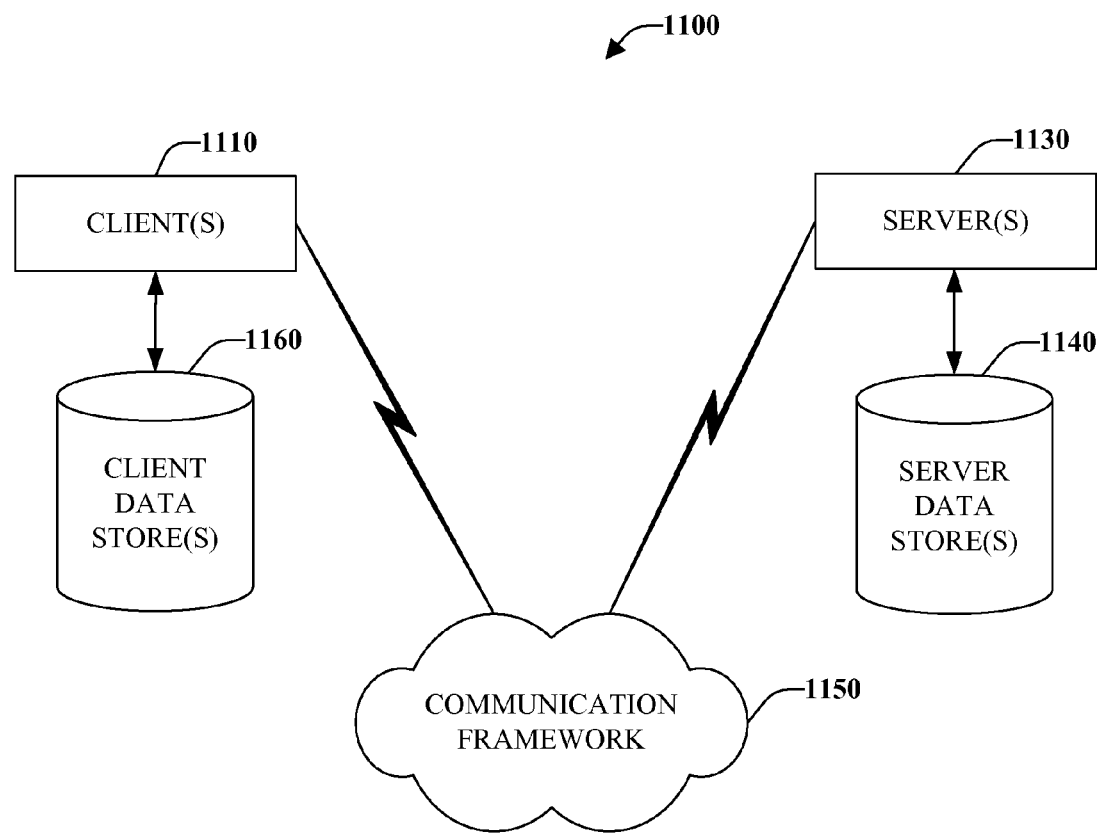
FIG. 11 illustrates a sample networking environment suitable for conducting remote communication in accordance with one or more aspects.

Referring now to FIGS. 10 and 11, there are illustrated block diagrams of an exemplary computer system operable to execute aspects of the disclosed subject matter. In order to provide additional context for various aspects of the subject disclosure, FIGS. 10 and 11, and the following discussion, are intended to provide a brief, general description of a suitable computing environment 1000 and networking environment 1100 in which the various aspects of the disclosure can be implemented. Additionally, while the disclosure has been described above in the general context of computer-executable instructions that may run on one or more computers, those skilled in the art will recognize that aspects of the disclosure also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media as well as removable and non-removable media. By way of example, and not limitation, computer-readable media can comprise computer storage media and communication media. Computer storage media can include both volatile and nonvolatile, removable and non-removable media implemented in any suitable method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the invention includes a computer 1002, the computer 1002 including a processing unit 1004, a system memory 1006 and a system bus 1008. The system bus 1008 couples components of system 1000 including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a nonvolatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject invention.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the invention can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 9BaseT wired Ethernet networks used in many offices.

Referring now to FIG. 11, there is illustrated a schematic block diagram of an exemplary remote communication environment operable to execute aspects of the disclosed subject matter. The system 1100 includes one or more client(s) 1110. The client(s) 1110 can be hardware and/or software (e.g., threads, processes, computing devices). The client(s) 1110 can house cookie(s) and/or associated contextual information related to data exchanged between a first remote device (1110) (e.g., including a MCD) and a second remote device (1130) (e.g., including a financial account server) as described herein, for example.

The system 1100 also includes one or more server(s) 1130. The server(s) 1130 can also be hardware and/or software (e.g., threads, processes, computing devices). The servers 1130 can house threads to perform transformations by employing the invention, for example. One possible communication between a client 1110 and a server 1130 can be in the form of a data packet adapted to be transmitted between two or more computer processes. The data packet may include a cookie and/or associated contextual information, for example. The system 1100 includes a communication framework 1150 (e.g., a global communication network such as the Internet) that can be employed to facilitate communications between the client(s) 1110 and the server(s) 1130.

Communications can be facilitated via a wired (including optical fiber) and/or wireless technology. The client(s) 1110 are operatively connected to one or more client data store(s) 1160 that can be employed to store information local to the client(s) 1110 (e.g., cookie(s) and/or associated contextual information). Similarly, the servers 1130 are operatively connected to one or more server data store(s) 1140 that can be employed to store information local to the servers 1130.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that integrates a mobile communication device (MCD) with personal/commercial finance and identification, comprising:
    an integration component that associates a financial account with the MCD, wherein the integration component is resident to the MCD, wherein a concurrent user employs the MCD to access the financial account and wherein the concurrent user is one of a plurality of users pre-authorized to employ the MCD to access user-specific financial information, wherein the concurrent user is the user of the plurality of users who employs the MCD concurrently with the access to the financial account;
    a data store, resident to the MCD, that synchronizes with the financial account and locally saves transaction and balance information consistent with the financial account;
    an account user interface (UI) application resident to the MCD that provides user-specific access to the financial account; and
    an identification component resident to the MCD that biometrically verifies an identity of the concurrent user from the plurality of users of the MCD, determines authorization of the concurrent user to access the financial account and, when access is authorized, conditions access to user-specific data based on the verified biometric identity,
    wherein a processor communicatively coupled to the data store executes instructions associated with one or more of the integration component, the account UI application, or the identification component.

2. The system of claim 1, wherein the financial account is a checking account, savings account, credit account, money market account, certificate of deposit account, commercial loan account, state or federal sponsored personal or business loan account, or an industrial business account, or a combination thereof.

3. The system of claim 1, comprising a synchronization component that communicatively couples the MCD with an electronic server of an entity that sponsors and maintains the financial account, by way of a remote communication interface, wherein the synchronization component is at least one of resident on the MCD, remote from the MCD, or a combination of resident on the MCD and remote from the MCD.

4. The system of claim 3, comprising:
    a transaction database that provides rules for conducting a transaction related to the financial account via the MCD, wherein the transaction is initiated and completed autonomously via the MCD; and an update component that synchronizes information related to the transaction at the MCD and the electronic server via the remote communication interface, wherein the update component is at least one of resident on the MCD, remote from the MCD, or a combination of resident on the MCD and remote from the MCD.

5. The system of claim 1, the identification component further comprises a biometric identifier that employs biometric recognition to generate, extract and/or receive information that uniquely identifies the concurrent user.

6. The system of claim 5, the biometric identifier stores a unique biological aspect of the plurality of pre-authorized users, receives a unique biological aspect of an intended user, and verifies the intended user as the concurrent user when the received unique biological aspect matches the stored unique biological aspect.

7. The system of claim 1, comprising an authentication component that can provide a digital signature for the concurrent user based on the verified identity, wherein the authentication component is at least one of resident on the MCD, remote from the MCD, or a combination of resident on the MCD and remote from the MCD.

8. The system of claim 1, the MCD serves as a passport for the concurrent user upon verification of identity of the concurrent user.

9. The system of claim 1, comprising an online chat interface that connects the MCD to a network chat server, the MCD verifies the identity of the concurrent user on the network chat server, wherein the online chat interface is at least one of resident on the MCD, remote from the MCD, or a combination of resident on the MCD and remote from the MCD.

10. The system of claim 1, comprising a credit interface that retrieves credit history of the concurrent user from an online server, the MCD verifies the identity of the concurrent user to obtain credit history at the online server, wherein the credit interface is at least one of resident on the MCD, remote from the MCD, or a combination of resident on the MCD and remote from the MCD.

11. The system of claim 1, comprising a student ID interface that couples the MCD with an electronic server of an educational institution and verifies a student ID of the concurrent user, wherein the student ID interface is at least one of resident on the MCD, remote from the MCD, or a combination of resident on the MCD and remote from the MCD.

12. The system of claim 1, the data store saves electronic files of secret personal, business or financial documents, or a combination thereof, and conditions access to the electronic files based on the verified identity.

13. The system of claim 1, comprising an accounting application that organizes information related to the financial account and a personal or business budget of the concurrent user and provides advice for a proposed or initiated transaction based at least on a state of the personal or business budget, wherein the accounting application is at least one of resident on the MCD, remote from the MCD, or a combination of resident on the MCD and remote from the MCD.

14. The system of claim 1, the MCD stores personal, social or business-related information of the concurrent user, including insurance information, medical information, membership ID information related to professional or social organizations, or a combination thereof, and provides proof of ID for the concurrent user in regard to the insurance, medical or membership information.

15. The system of claim 1, wherein the data store further saves a digital photograph, digitized analog photograph, digital video representation, or digital audio representation, or a combination thereof, of the plurality of pre-authorized users for determination and presentation at the MCD as further identification of the concurrent user.

16. A system that facilitates user identification for remote financial transactions conducted at an MCD, comprising:
means for receiving a request to initiate a remote financial transaction from the MCD associated with a financial account, wherein the request is initiated by a user that is one of a plurality of users predetermined to use the MCD;
means for receiving information that uniquely verifies identification of a user from a plurality of predetermined users of the MCD, wherein the information includes user-specific identification parameters of the user; and
means for corroborating the information that verifies identification at an electronic server or database associated with the financial account, wherein, when the identification is verified, access to the financial account is granted.

17. The system of claim 16, comprising:
means for querying the user to provide the information that verifies identification; and
means for receiving a response from the user, the response includes the information that verifies identification.

18. The system of claim 16, comprising:
means for communicatively coupling the MCD and the electronic server or database; and
means for synchronizing transaction and account balance data between the MCD and the electronic server associated with the financial account, wherein the synchronization facilitates autonomous approval of a transaction via the MCD.

19. The system of claim 16, comprising means for approving a financial transaction initiated via the MCD using a transaction rule set synchronized from the electronic server, the transaction rule set provides guidelines for permissible and impermissible financial transactions associated with the financial account.

20. The system of claim 16, comprising means for securing remote communication related to the remote financial transaction that encrypts data received from and transmitted to the MCD.

21. The system of claim 16, comprising means for interfacing with a networked server that utilizes the information that verifies identification of the user to provide identity of the user to an application at the networked server.

22. The system of claim 21, the means for interfacing with a networked server receives a credit history, a government record, a financial transaction history associated with the financial account or one or more past or present additional accounts, or an employment history of the user, or a combination thereof, from the application upon providing the information that verifies identification of the user.

23. The system of claim 21, the means for interfacing with a networked server further provides the information that verifies identification of the user to the application to serve as a passport, student ID, or state or federal ID for the user, or a combination thereof.

24. The system of claim 21, the means for interfacing with a networked server provides the application with the information that verifies identification of the user in conjunction with at least one of insurance information, medical information, membership information, or financial account information associated with the user, or a combination thereof, to serve as a record of insurance, a record of medical history, a record of membership in an organization, or a record of account, respectively, or a combination thereof.

25. A method for integrating an MCD with personal/commercial finance and identification, comprising:
- associating a financial account with the MCD wherein the financial account is at least one of a checking, savings or credit account associated to one of a plurality of predetermined users;
- storing predetermined information that uniquely identifies each of the plurality of predetermined users of the MCD, wherein the predetermined information is stored within the MCD;
- receiving physiological information that uniquely identifies a user presently employing the MCD;
- comparing the physiological information that uniquely identifies the user presently employing the MCD with the predetermined information that uniquely identifies the plurality of the predetermined users, wherein the comparison autonomously occurs at the MCD; and
- providing access to the financial account by way of the MCD when the information that uniquely identifies the user presently using the MCD matches the predetermined information that uniquely identifies the one of the plurality of the predetermined users.

* * * * *